United States Patent [19]

Kragh

[11] 4,435,339
[45] Mar. 6, 1984

[54] FALLING FILM HEAT EXCHANGER

[75] Inventor: Loren G. Kragh, Federal Way, Wash.

[73] Assignee: Tower Systems, Inc., Tacoma, Wash.

[21] Appl. No.: 63,797

[22] Filed: Aug. 6, 1979

[51] Int. Cl.³ .............................................. B01F 3/04
[52] U.S. Cl. ........................... 261/153; 165/DIG. 1;
261/112; 261/DIG. 11; 261/DIG. 77
[58] Field of Search ............... 261/112, 153, DIG. 11,
261/DIG. 77; 165/DIG. 1, 115; 159/4 CC

[56] References Cited

U.S. PATENT DOCUMENTS

| | | | |
|---|---|---|---|
| 1,847,845 | 3/1932 | Mullen | 261/112 X |
| 3,271,969 | 9/1966 | Lorentzen | 261/153 X |
| 3,274,752 | 9/1966 | Huyghe et al. | 261/153 X |
| 3,504,738 | 4/1970 | McGuffey | 261/153 X |
| 3,913,667 | 10/1975 | Meylan et al. | 165/115 |
| 3,997,635 | 12/1976 | Hallgren | 261/112 X |
| 4,019,951 | 4/1977 | Kragh | 159/4 CC |
| 4,096,214 | 6/1978 | Percevaut et al. | 261/112 X |
| 4,098,854 | 7/1978 | Knirsch et al. | 165/DIG. 1 |
| 4,119,140 | 10/1978 | Cates | 165/DIG. 1 |
| 4,202,847 | 5/1980 | Ernst et al. | 261/112 X |

Primary Examiner—Richard L. Chiesa
Attorney, Agent, or Firm—Richard W. Hanes

[57] ABSTRACT

The invention relates to a low pressure heat exchanger for use in an environment where metal parts would be subject to corrosion or scaling comprising a plurality of vertically disposed mutually parallel membranes acting as heat transfer surfaces and including fluid distributors and dispensing nozzles disposed near the top edge of the membranes so as to distribute hot liquid as a falling film down the membrane surface. From a second distributor set, a second liquid may be passed down the opposite surface of each membrane to provide liquid-to-liquid heat transfer. A draft producing device is employed to either allow a gas to flow directly over the heat transfer membrane or over the second liquid as it falls down the membrane surface to obtain a liquid-to-gas heat transfer or evaporative cooling of the second liquid.

5 Claims, 8 Drawing Figures

FALLING FILM HEAT EXCHANGER

BACKGROUND

In conventional heat exchangers structural strength for pressure containment of the fluids dominates design considerations. Metal tube-in-tube and tube-in-shell exchangers are examples of such designs.

The need has arisen for a low cost, low pressure heat exchanger that is not susceptible to the corrosion and scaling which typifies similar devices constructed of metal.

The heat exchanger of the present invention reduces operating pressures to the level that pressure containment does not dictate the shape or form of the mechanical configuration. This design freedom allows the usage of previously unacceptable materials of construction such as structurally strong plastic extrusions and thin plastic membranes for heat transfer surfaces. The use of low cost materials and the low pressure design of the system also allow the use of more complex flow patterns to achieve novel and heretofor unexpected results from coolers or evaporators using direct contact between liquid and gas.

The reduction in operating pressure is achieved with two significant departures from the prior art. First, heat transfer starts with the establishment of a uniform falling liquid film on a membrane type of heat exchange surface. The falling film is established with low pressure nozzles, (e.g. open pipes), which require only 1-2 p.s.i.g. operating pressure in the distribution manifolds, and even less pressure in the gravity fed fluid collection manifolds. Secondly, air plenums coupled with pressure relief ports and ducts are used to reduce the gauge pressure across the heat transfer surface to nearly zero.

In the apparatus of the present invention the uniform falling film of highly concentrated solutions, established with very low pressure nozzles, avoids air entrainment due to splashing. Entrainment due to surface stripping of water droplets is avoided by controlling the relative velocity between the air draft and the falling film.

With this background it is seen that the primary object of the invention is to provide a low pressure heat exchanger apparatus having a large degree of design flexibility to enhance the operating effectiveness of direct liquid-gas contact and liquid to liquid heat transfer.

A further object of the invention is to provide a heat exchange device which has low area unit cost for fabrication and operation.

Another object is to provide a heat exchanger which can simultaneously or alternatively perform liquid to liquid heat exchange, liquid to gas heat exchange and liquid to gas mass transfer.

Other and still further objects features and advantages will be apparent upon a reading of the following detailed description of the invention taken in connection with the accompanying drawings in which.

DESCRIPTION OF THE INVENTION

Figures 1, 2:
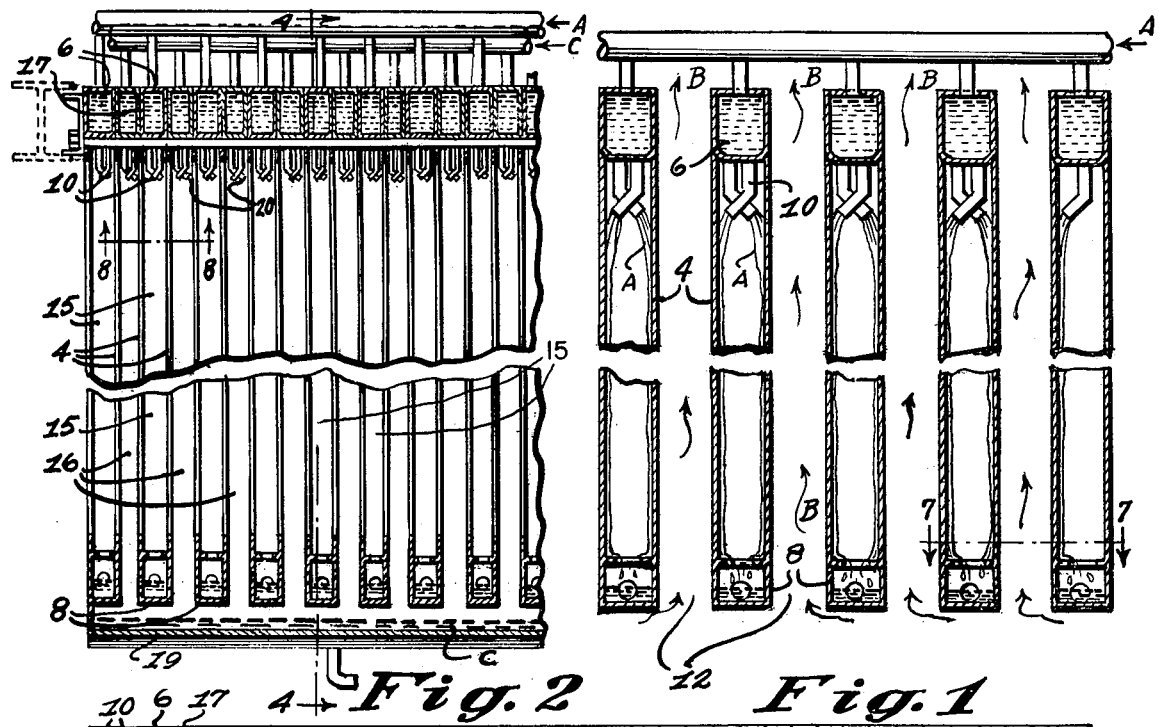
FIG. 1 is a fragmentary cross-sectional view of a simplified form of the heat exchanger of the present invention showing a series of alternatingly disposed hot water compartments and air ducts.
FIG. 2 is a fragmentary cross-sectional view of a preferred form of the heat exchanger of the present invention showing a series of alternatingly disposed hot water compartments and brine flowing passages, which passages may function also as air ducts.
Figure 3:
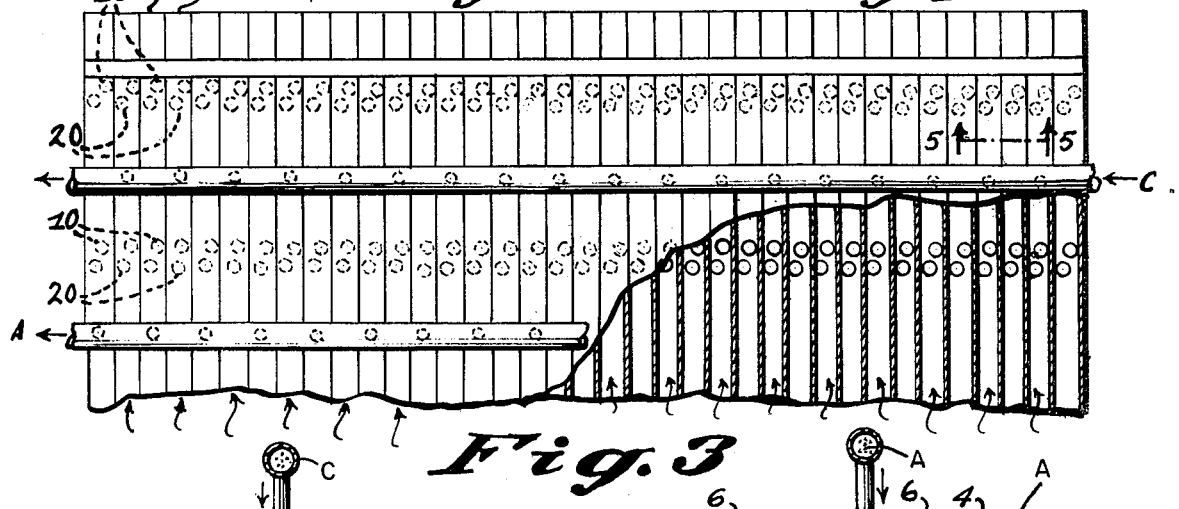
FIG. 3 is a top fragmentary view of the heat exchanger of FIG. 2 with a portion thereof broken away and shown in cross section.
Figure 4:
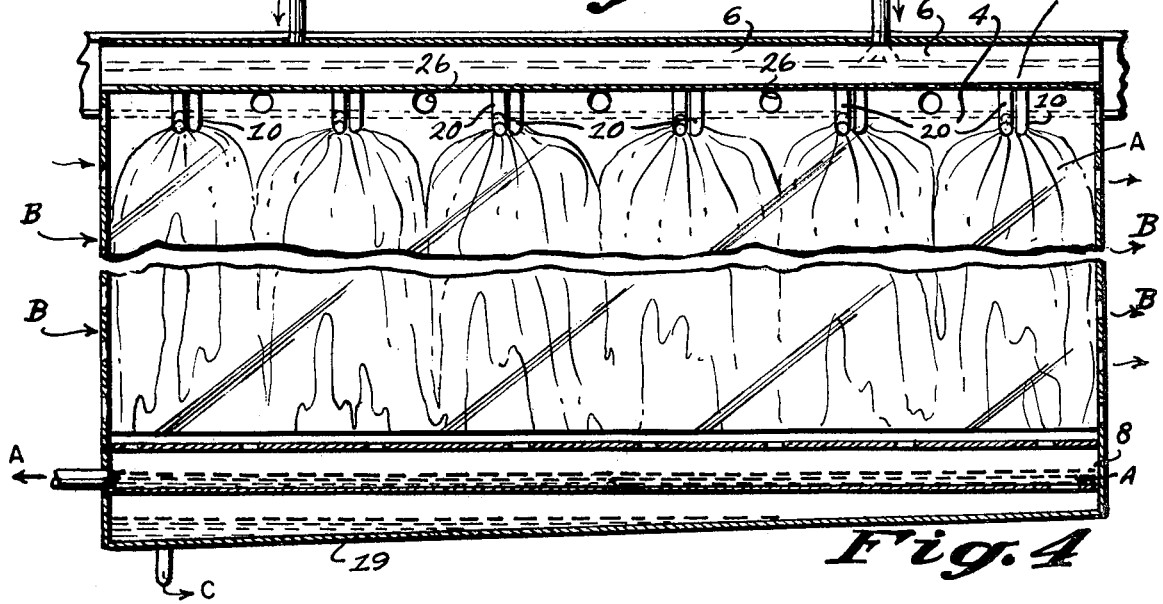
FIG. 4 is a fragmentary cross-sectional view of the preferred form of the invention taken along lines 4—4 of FIG. 2 and with a portion thereof broken away and shown in cross-section.
Figure 5:
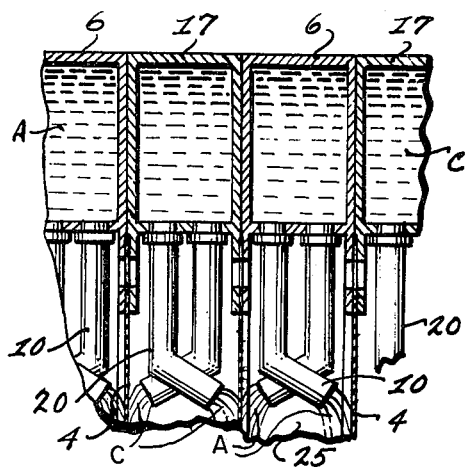
FIG. 5 is an enlarged fragmentary cross-sectional view taken along lines 5—5 of FIG. 3 showing alternately disposed hot water and brine distributors and the distribution nozzles.
Figure 7:
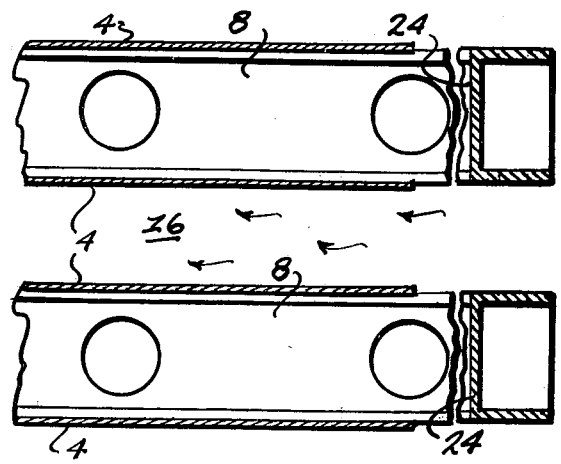
FIG. 7 is an enlarged fragmentary cross-sectional view of the heat collector troughs taken along line 7—7 of FIG. 1.

A simplified form of the invention is shown in FIG. 1 where a plurality of non-metalic mutually parallel sheets 4 of heat transfer material are vertically disposed with interspacing between the sheets. A header or hot liquid distributor 6 is located above each pair of facing sheet surfaces and a liquid collector trough 8 is disposed at the bottom edge of each pair of facing sheets at the top of which there is the distributor 6. A plurality of longitudinally spaced apart nozzle pairs 10 located in a line lengthwise of the distributors 6 dispense the liquid A flowing within the distributor 6 as an even film to fall by gravity down the facing surfaces of the sheets 4 and to be collected at the bottom edge of the sheets in the collector trough 8. Alternately between each pair of sheets 4, whose facing surfaces carry the liquid film A from the distributor 6, there is provided an air space or duct 12 through which air B or other gas may be made to flow, either upwardly, downwardly or transversely therethrough. The difference in temperature between the hot liquid A and the cooler air stream B provides a thermal gradient across the heat transfer surface 4 and thermal energy moves via sensible heat transfer from the hot liquid film, through the sheet 4 and into the air B passing through the air duct 12.

FIGS. 2 through 5 and 7 and 8 depict a preferred embodiment of the invention utilizing the basic concepts of the simplified form of FIG. 1. Each of the parts in the preferred form which correspond to parts in the FIG. 1 embodiment will contain similar reference numerals. The spaces beneath each of the hot liquid distributors 6, including the collectors 8, will be referred to as hot water compartments 15.

In the FIG. 2 embodiment a plurality of hot water compartments 15 are alternately interspersed with secondary liquid chambers 16 which are provided along the top thereof with lengths of liquid carrying tubing 17, similar to that used for the the hot water distributor 6. Longitudinally spaced apart nozzle pairs 20 are disposed to depend from the floor of each of the tubes 17 and communicate with the interior thereof so as to dispense the liquid C flowing in the tubes 17 onto the outside surfaces of the pairs of sheets 4 which form the sides of each hot water compartment 15. The nozzles are sized and positioned such that the individual streams of liquid C exiting the nozzles impinge on, spread and join so as to decend as a falling film down the outside surfaces of the sheets 4, similar to the falling film of hot water A on the inside surfaces of the sheets. In such an embodiment there is a transfer of heat energy from the hot water A falling down the inside walls of the compartments 15 to the liquid C falling down the outside surfaces of the sheets 4.

The interspace below the tubes 17 and in which the liquid C is confined as it falls as a film may advantageously be constructed as an air duct, similar to the air ducts 12 of the FIG. 1 embodiment. Because the FIG. 2 air ducts also contains a flowing liquid the reference numeral 16 is used to identify the air duct spaces of the embodiment of FIGS. 2–5, 7 and 8. The liquid C which forms a falling film on the sides of the air duct compartment 16 is collected by a basin 19 located underneath the lower edges of the compartments 16 of the heat exchanger.

When the air stream B traverses the air duct compartment 16 and the walls of that compartment are wetted with the falling liquid C, heat and mass transfer occurs between the two streams. A fraction of the liquid C evaporates and liquid C is cooled by a combination of latent and sensible heat transfer to air stream B, a process commonly known as evaporative cooling.

The heat transfer sheets 4 are constructed of thin film, preferably non-metalic material such as three to five mil thickness polyester plastic such as "Mylar". The sheets are secured within a rectangular frame comprising the distributor 6 at the top, the hot water collector 8 at the bottom and vertical end pieces 24. There may be intermediate vertically disposed stiffeners between the top and bottom frame members to reduce the size of the unsupported sheet area.

In operation the sheets 4 are subjected to the static loads induced by the weight of the clinging liquid film and the dynamic loads created by the moving air currents in the duct spaces 12 or 16. The hot water compartments 15 are virtually dead air spaces, being enclosed at the top by the distributor 6, at the bottom by the collector 8 and on the ends by the end plates 24. Depending on several physical factors, such as the air current velocity or the structural strength of the sheets 4, it may be desirable to provide for pressure equalization across the sheets 4 or between the adjacent compartments 15 and 16. One method of providing such relief is to provide pressure balancing ports or openings 26 in the upper portion of each of the sheets 4 which will provide for the transfer of air from one compartment to another to equalize the pressure across the sheets 4.

The equal widths shown for the air duct 16 and the hot water compartment 15 are for illustration only. It is advantageous to minimize the thickness of the compartment 15 and thereby maximize the total heat transfer or evaporation per unit volume of the heat exchanger.

Figure 6:
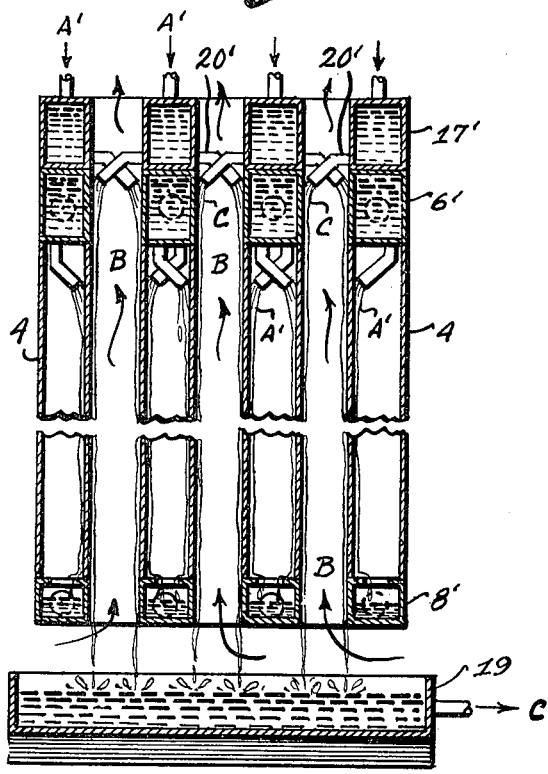
FIG. 6 is a fragmentary cross-sectional view of a third embodiment of the heat exchanger of the present invention with the brine distributors superimposed on the hot water distributors.
Figure 8:
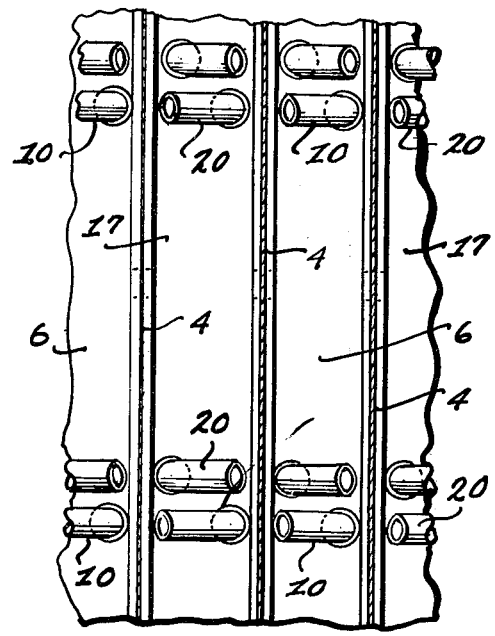
FIG. 8 is an enlarged fragmentary cross-sectional view taken along lines 8—8 of FIG. 2 showing the bottom side of the hot water and brine distributors of the preferred form of the heat exchanger of the present invention showing the distribution nozzles.

While the preferred form of the invention, as illustrated in FIGS. 2–5, 7 and 8, is intended to accommodate a cross-flow of air through the ducts 16, another form of construction, as seen in FIG. 6, can be utilized for co-flowing air or counter-flow air. For this latter embodiment the secondary liquid distributor 17' is placed on top of the hot water distributor 6', the nozzle pairs 20' coming out of the sides of the distributor 17' in order to provide the necessary top opening for the air flow. In this embodiment, liquid distributor 6' is unchanged over the FIG. 2 embodiment except that stream A' enters distributor 6' from an end rather than from the top due to the placement of the distributor 17' above the distributor 6'.

The heat transfer functions which are capable of being performed by the heat exchanger of the present invention are liquid-to-air dry cooling, as shown and described relative to FIG. 1, liquid-to-liquid cooling across the heat transfer membranes and evaporative cooling from direct liquid-to-air contact. By mechanically derived valving and shunting these functions may be performed singly, in combination, alternately, or in combination and alternately.

These several functions of the apparatus are beneficial in the various heat and mass transfer functions required in processes for the removal of dissolved solids from water utilizing a combination of heat exchange and evaporation. In such a process there may be a liquid stream A, air stream B, and liquid stream C, all flowing simultaneously. Liquid stream A may be an industrial waste heat product such as the hot condenser discharge coolant in a steam electric power station. Liquid stream C is concentrated industrial waste water, such as conventional cooling tower blowdown or deionizer waste water. The air stream B is the air draft through a cooling tower. Using the device of the present invention in such an arrangement, the liquid stream A transfers thermal energy to the liquid stream B via liquid-to-liquid heat transfer across the heat transfer surface 4. The transferred thermal energy propels the evaporation and volume reduction of the liquid stream C. Liquid stream C is cooled by transfer of latent and sensible heat to the air stream B and stream C in turn then cools liquid stream A by liquid to liquid heat transfer.

In a conventional cooling tower setting, dry cooling can be achieved with a closed hot water loop. The falling film heat exchanger of FIG. 1 for example, is disposed within a cooling tower in lieu of the normal fill. Sensible heat is transferred from the hot liquid stream A to the air stream B. On the other hand, where water is available for evaporative cooling, the hot water can be diverted into the distributor 17 and the nozzles 20 to provide direct liquid to air contact. In both cases the air stream B is provided by the draft created by the cooling tower configuration.

Stream C in the "cooling by waste water evaporation" mode will typically have a dissolved solids content of 10–20% by weight, and entrainment of this liquid in air stream B is environmentally unacceptable. In the present invention, stream C is distributed as a uniform falling film on sheets 4 without splashing and with virtually no entrainment of droplets or mist. The non-metalic construction of the heat transfer sheets 4 and the other elements of the heat exchanger are advantageous in the environment of a high concentration of dissolved solids in order to avoid scaling and corrosion.

These three operating modes for a cooling tower with the internally disposed heat exchanger of the present invention are summarized as cooling by water evaporation, cooling by conventional evaporation, and dry cooling. Changing from mode to mode can be done by turning and diverting streams on or off with conventional valves. The availability of the three modes provides flexibility to respond to various combinations of cooling and waste water reduction requirements.

Although the description of the operation of the invention has highlighted uses in a cooling tower environment, it is to be understood that the heat exchanger can function for any low guage pressure heat transfer process.

I claim:

1. A falling film heat exchanger for establishing thermal contact between two fluids of different temperatures comprising:
 a plurality of spaced apart and juxtaposed cells each having:
  substantially vertically disposed parallel side walls; and
  first fluid collector means disposed at the bottom of the side walls along the length thereof;
 first fluid distributing means disposed at the top of the cell side walls along the length thereof for dispensing a first fluid in a substantially uniform film over the inside of each of the cell side walls;
 second fluid distributing means disposed above the interspace between each of said cells along the length thereof for dispensing a second fluid in a substantially uniform film over the outside and confronting side wall surfaces of two juxtaposed cells; and
 second fluid collector means disposed beneath the said interspaces for collecting the said second fluid.

2. The heat exchanger of claim 1 and further including:
 circulation means for causing air to flow through the interspaces between cells in direct contact with the said second fluid film.

3. The heat exchanger of claim 2 and further including pressure relief means between the inside and outside of each cell to equalize the pressure across each of the side walls.

4. The combination of claim 3 wherein the first and second fluid distributor means include:
 tubular conduit and a plurality of nozzles depending therefrom to direct liquid from the interior of the conduit against the side walls of the cells.

5. The combination of claim 4 wherein the said side walls each comprise a sheet of pliant plastic material having a rigid supporting frame.

* * * * *